United States Patent
Olson et al.

(10) Patent No.: US 7,221,702 B2
(45) Date of Patent: May 22, 2007

(54) TRANSMITTER/RECEIVER FOR BIDIRECTIONAL COMMUNICATIONS

(75) Inventors: Allan Olson, Spanga (SE); Torbjorn Randahl, Nacka (SE)

(73) Assignee: Infineon Technologies AG, Munich (DE)

( * ) Notice: Subject to any disclaimer, the term of this patent is extended or adjusted under 35 U.S.C. 154(b) by 526 days.

(21) Appl. No.: 10/488,052

(22) PCT Filed: Feb. 26, 2003

(86) PCT No.: PCT/SE03/00309

§ 371 (c)(1),
(2), (4) Date: Feb. 27, 2004

(87) PCT Pub. No.: WO03/075478

PCT Pub. Date: Sep. 12, 2003

(65) Prior Publication Data

US 2005/0063477 A1    Mar. 24, 2005

(30) Foreign Application Priority Data

Mar. 4, 2002    (SE) .................................... 0200666

(51) Int. Cl.
*H04B 3/00* (2006.01)
(52) U.S. Cl. .................... 375/219; 375/238; 375/257; 375/348; 375/259; 365/185.25; 341/135; 327/108
(58) Field of Classification Search ............. 375/219, 375/220, 257, 260; 327/53, 132; 455/84, 455/73; 333/32, 17.1, 124; 379/394; 318/693

See application file for complete search history.

(56) References Cited

U.S. PATENT DOCUMENTS

| | | | | |
|---|---|---|---|---|
| 4,636,771 A | * | 1/1987 | Ochs | 455/402 |
| 4,736,385 A | * | 4/1988 | Pratt et al. | 375/219 |
| 4,746,897 A | * | 5/1988 | Shuey | 375/219 |
| 4,896,333 A | * | 1/1990 | Can | 375/219 |
| 4,984,248 A | * | 1/1991 | Hong | 375/219 |
| 5,410,594 A | * | 4/1995 | Maruyama | 379/398 |
| 5,579,336 A | * | 11/1996 | Fitzgerald et al. | 375/219 |
| 5,748,675 A | * | 5/1998 | Hormel et al. | 375/257 |
| 5,771,262 A | * | 6/1998 | Benayoun et al. | 375/257 |
| 5,838,722 A | * | 11/1998 | Consi | 375/219 |

(Continued)

FOREIGN PATENT DOCUMENTS

EP    0 746 117    3/1999

*Primary Examiner*—Vu Le
*Assistant Examiner*—Abdellah Lamane
(74) *Attorney, Agent, or Firm*—Brinks Hofer Gilson & Lione

(57) ABSTRACT

In a transmitter/receiver for bidirectional communication with a transmission medium, the transmitter comprises an amplifier having an input terminal for signals to be transmitted, an output stage with output terminals coupled via resistors to the transmission medium, and a negative feedback circuit connected with its input terminals to the output terminals and with its output terminal to the input terminal of the amplifier. The receiver is connected with first input terminals to the output terminals of the output stage. A current mirror is connected with its input terminal to the input terminal of the amplifier output stage and with its output terminals via resistors across a load. The load is connected across second input terminals of the receiver. The receiver is adapted to extract signals received from the transmission medium by subtracting voltages between said second input terminals from voltages between said first input terminals.

7 Claims, 1 Drawing Sheet

U.S. PATENT DOCUMENTS 6,137,359 A    10/2000  Gorcea et al.
6,426,970 B1*  7/2002   Thornton et al. ........... 375/220

2001/0040917 A1*  11/2001  Kumar et al. ............... 375/219

* cited by examiner

TRANSMITTER/RECEIVER FOR BIDIRECTIONAL COMMUNICATIONS

TECHNICAL FIELD

The invention relates generally to transmitters/receivers for bidirectional communication with transmission media and more specifically to an arrangement in such transmitters/receivers for extracting received signals.

BACKGROUND OF THE INVENTION

A known transmitter/receiver for such communication is shown in FIG. 1.

In a manner known per se, the transmitter comprises an amplifier 1 having an input terminal 4 for signals to be transmitted, an output stage 3 with output terminals 5, 6 coupled via termination resistors 7, 8 to a transmission medium, e.g. a transmission line, represented by a load 11, and a negative feedback circuit 2 connected with its input terminals to the output terminals 5, 6 of the output stage 3 and with its output terminal to the input terminal 4 of the amplifier 1, where the output signal of the feedback circuit 2 sets the transmit gain.

The receiver 9 is connected with input terminals 12, 13 across the load 11, and is provided with an output 10 for outputting received signals.

In the transmitter/receiver in FIG. 1, when the termination resistors 7, 8 have the same combined resistance as the load 11, half of the transmitted and half of the received signals are extracted by measuring the signal across the termination resistors 7, 8.

SUMMARY OF THE INVENTION

The object of the invention is to extract the receive signal while suppressing the transmitted signal.

This is attained according to the invention by converting the receive current that flows into the transmitter amplifier to a voltage, and subtracting that voltage from the transmission line voltage to extract the receive voltage while suppressing the transmitted signal.

BRIEF DESCRIPTION OF THE DRAWING

The invention will be described more in detail below with reference to the appended drawing on which FIG. 1, described above, shows a known transmitter/receiver for bidirectional communication with a transmission medium.

DESCRIPTION OF THE INVENTION

Figure 1:
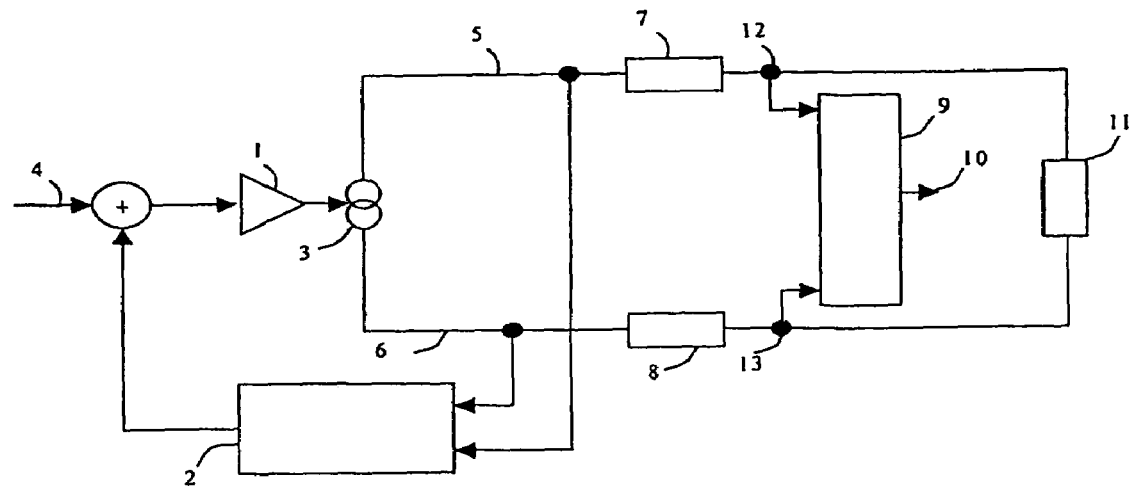
Figure 2:
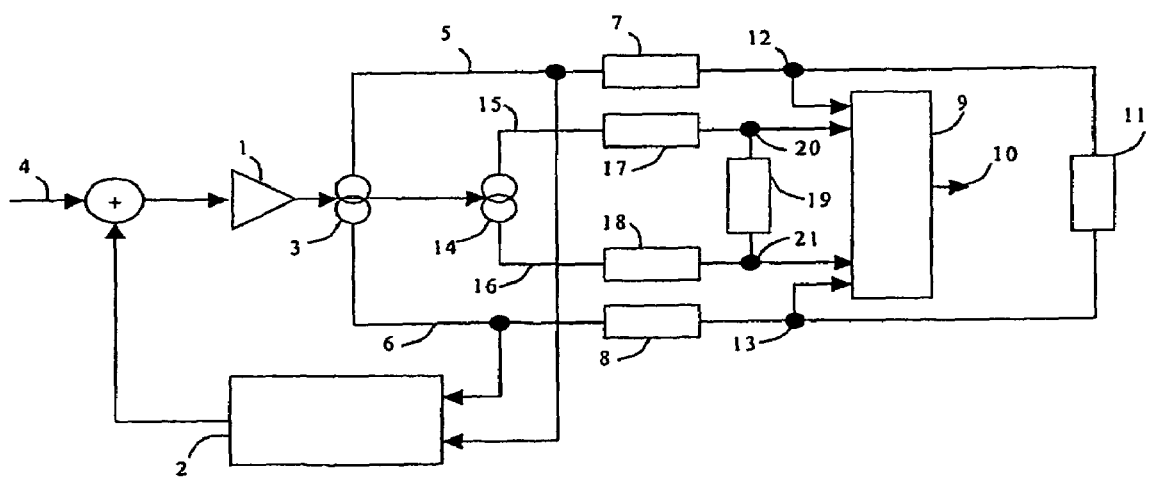
FIG. 2 shows a transmitter/receiver in accordance with the invention for such bidirectional communication.

In FIG. 2, elements that are identical to elements in FIG. 1 have been provided with the same reference characters.

In accordance with the invention, a current mirror 14 is connected with its input terminal to the input terminal of the amplifier output stage 3 and with its output terminals 15, 16 via resistors 17, 18 across a load 19. The impedance of the load 19 is matched to the impedance of the transmission medium or load 11 such that the impedance of the load 19 is k times the impedance of the load 11. In the same way, the resistance of the resistors 17 and 18 is matched to be k times the resistance of the resistors 7 and 8, respectively. Also, the current in the current mirror 14 is set to be 1/k times the current in the amplifier output stage 3. The factor k is used to reduce the power dissipated in the resistors 17, 18 and the load 19.

The load 19 is connected between input terminals 20, 21 of receiver 9'.

In accordance with the invention, the receiver 9' is adapted to extract signals received from the transmission medium 11 by subtracting voltages between the input terminals 20, 21 from voltages between the input terminals 12, 13.

The transmit signal will appear in-phase over both the load 11 and the load 19 while the receive signal will appear in-phase over the load 11 and anti-phase over the load 19.

This results in that, on the output 10 of the receiver 9' in FIG. 2, the receive signal is doubled compared with FIG. 1 while the own transmitted signal, noise and distortion are suppressed.

The invention is particularly well suited in applications where active termination is used and in fully differential line driver structures.

The invention claimed is:

1. A transmitter/receiver for bidirectional communication with a transmission medium, comprising: a transmitter comprising an amplifier having an input terminal for signals to be transmitted, an output stage with output terminals coupled via resistors to the transmission medium, and a negative feedback circuit connected with its input terminals to the output terminals of the output stage and with its output terminal to the input terminal of the amplifier; a receiver connected with first input terminals to the output terminals of the output stage; and a current mirror having an input terminal connected to the amplifier output stage, and a plurality of output terminals coupled via resistors across a load and connected across second input terminals of the receiver, the receiver being adapted to extract signals received from the transmission medium by subtracting voltages between said second input terminals thereof from voltages between said first input terminals thereof.

2. The transmitter/receiver according to claim 1, wherein the load and the transmission medium are impedance matched.

3. The transmitter/receiver according to claim 2, wherein the resistors connected to the output terminals of the current mirror and the resistors connected to the output terminals of the amplifier output stage are resistance matched.

4. The transmitter/receiver according to claim 3, wherein an impedance of the load is k times an impedance of the transmission medium, a resistance of the resistors connected to the output terminals of the current mirror is k times a resistance of the resistors connected to the output terminals of the amplifier output stage, and a current in the current mirror is set to be 1/k times a current in the amplifier output stage.

5. The transmitter/receiver according to claim 2, wherein an impedance of the load is k times an impedance of the transmission medium, a resistance of the resistors connected to the output terminals of the current mirror is k times a resistance of the resistors connected to the output terminals of the amplifier output stage, and a current in the current mirror is set to be 1/k times a current in the amplifier output stage.

6. The transmitter/receiver according to claim 1, wherein an impedance of the load is k times an impedance of the transmission medium, a resistance of the resistors connected to the output terminals of the current mirror is k times a resistance of the resistors connected to the output terminals of the amplifier output stage, and a current in the current mirror is set to be 1/k times a current in the amplifier output stage.

7. The transmitter/receiver according to claim 1, wherein the resistors connected to the output terminals of the current mirror and the resistors connected to the output terminals of the amplifier output stage are resistance matched.

* * * * *